W. B. CHENOWETH.
TRACTOR.
APPLICATION FILED JULY 1, 1918.

1,331,184.

Patented Feb. 17, 1920.
4 SHEETS—SHEET 2.

INVENTOR.
W. B. CHENOWETH.
BY
ATTORNEY.

W. B. CHENOWETH.
TRACTOR.
APPLICATION FILED JULY 1, 1918.

1,331,184.

Patented Feb. 17, 1920.
4 SHEETS—SHEET 3.

INVENTOR.
W. B. CHENOWETH.
BY
ATTORNEY.

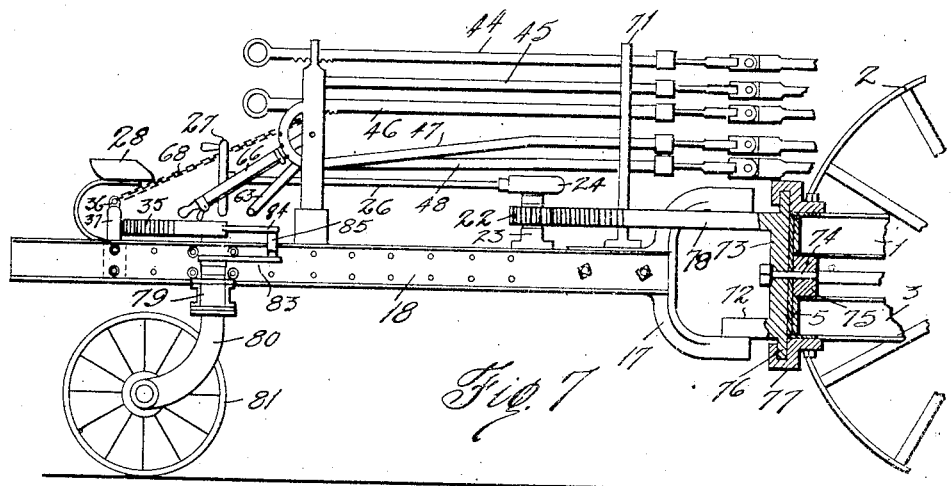
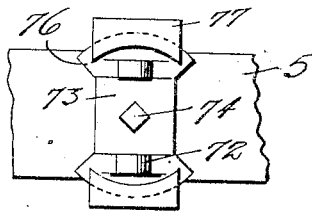
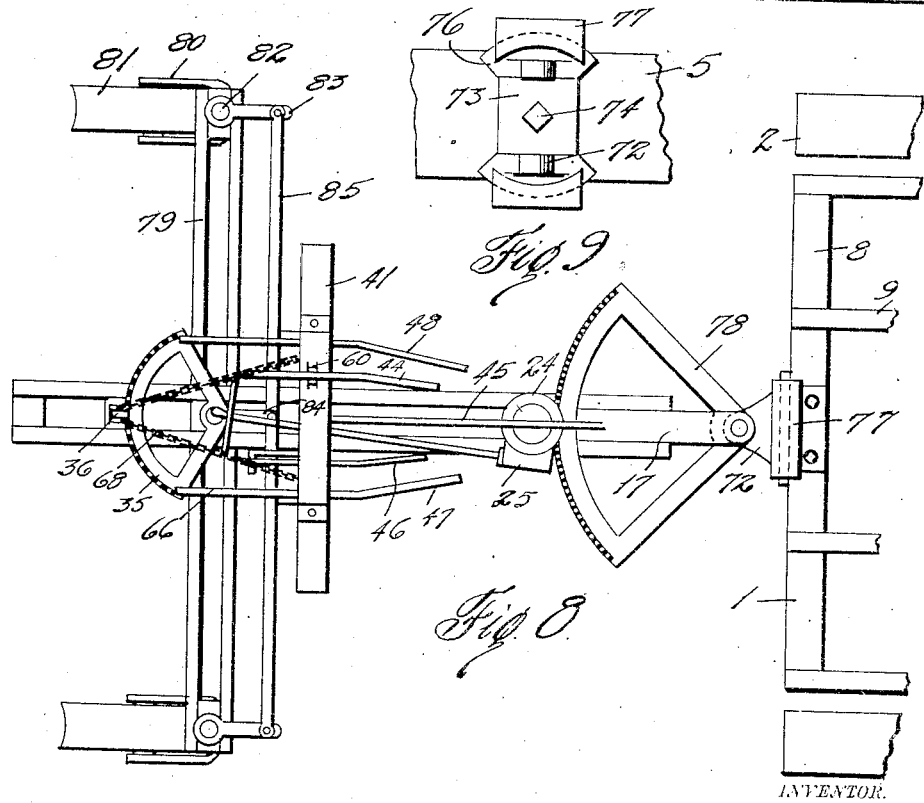

UNITED STATES PATENT OFFICE.

WILLIAM B. CHENOWETH, OF FORT WORTH, TEXAS, ASSIGNOR, BY MESNE ASSIGNMENTS, TO BENJAMAN TRACTOR COMPANY, OF DALLAS, TEXAS, AN ASSOCIATION HAVING AS ITS TRUSTEES S. A. McILHENNY, W. B. CHENOWETH, JACK A. SCHLEY, AND GEORGE W. TAMSITT, ALL OF DALLAS COUNTY, TEXAS.

TRACTOR.

1,331,184.      Specification of Letters Patent.      Patented Feb. 17, 1920.

Application filed July 1, 1918. Serial No. 242,834.

*To all whom it may concern:*

Be it known that I, WILLIAM B. CHENOWETH, a citizen of the United States, residing at Fort Worth, in the county of Tarrant and State of Texas, have invented certain new and useful Improvements in Tractors, of which the following is a specification.

This invention relates to new and useful improvements in tractors.

The invention has particularly to do with the type of tractors involving a forward driving unit supported on driving ground wheels with a trailing draft unit hinged to the driving unit. In a tractor of this type the driver's seat may be arranged on the trailing unit and all of the control mechanism carried in convenient relation to the same. The jointed structure permits of the removal of the trailing unit and the substitution of a wheel supported agricultural implement or machine.

The invention contemplates certain advantageous features having for their purpose the accomplishment of beneficial results. By providing means for locking the trailing unit in laterally adjusted positions and at the same time maintaining the line of draft of the tractor, tools and implements may be attached so as to plow and cultivate close to fences and other obstructions, and to meet the various conditions encountered by the modern farmer. It is one of the purposes of the invention to produce a machine which, by means of convenient and practical adjustments and a simple arrangement of parts, will have a large field of adaptability and increased utility.

It is also proposed to provide a joint between driving and trailing units which will not only permit a lateral adjustment of the trailing unit but an axial adjustment of the same so that the trailing units and the implements carried thereby will not be displaced from their work by relative displacement of the driving unit with relation to a horizontal plane.

The invention will be more readily understood from a reading of the following specification and by reference to the accompanying drawings, in which an example of the invention is illustrated, and wherein—

Figure 1:
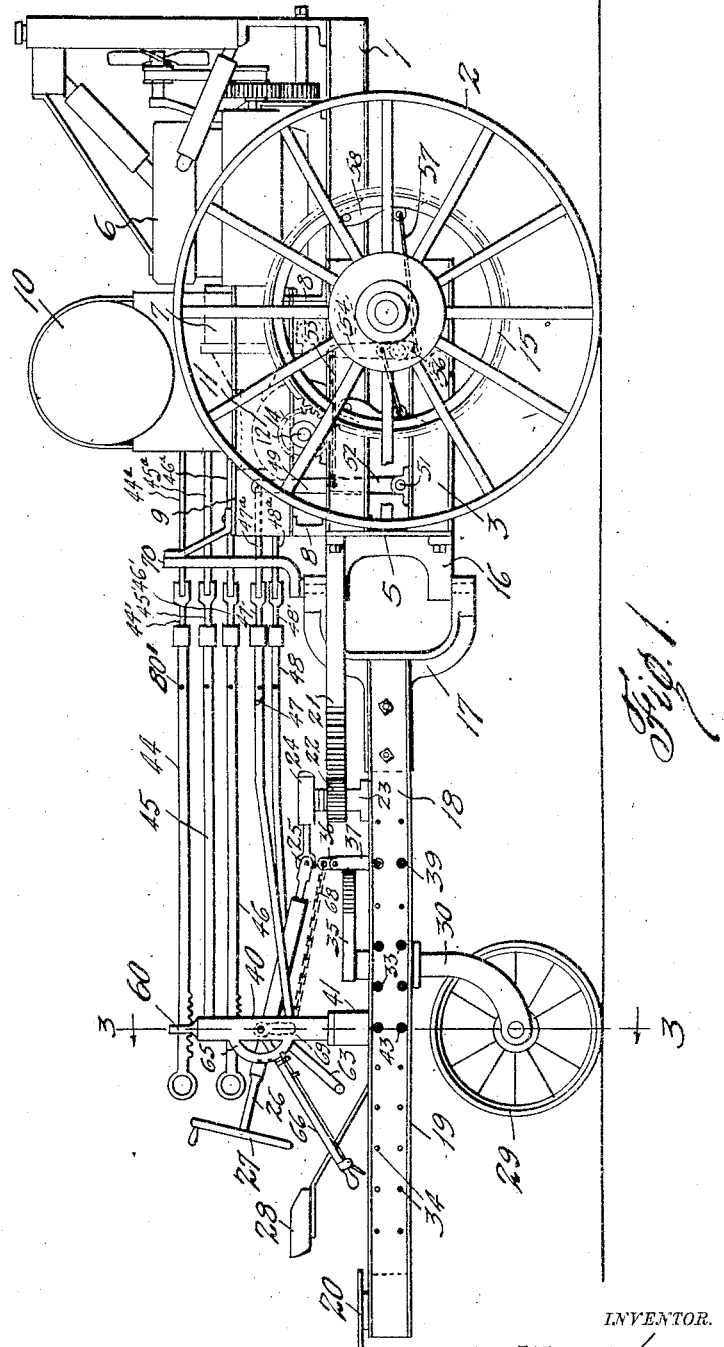
Figure 2:
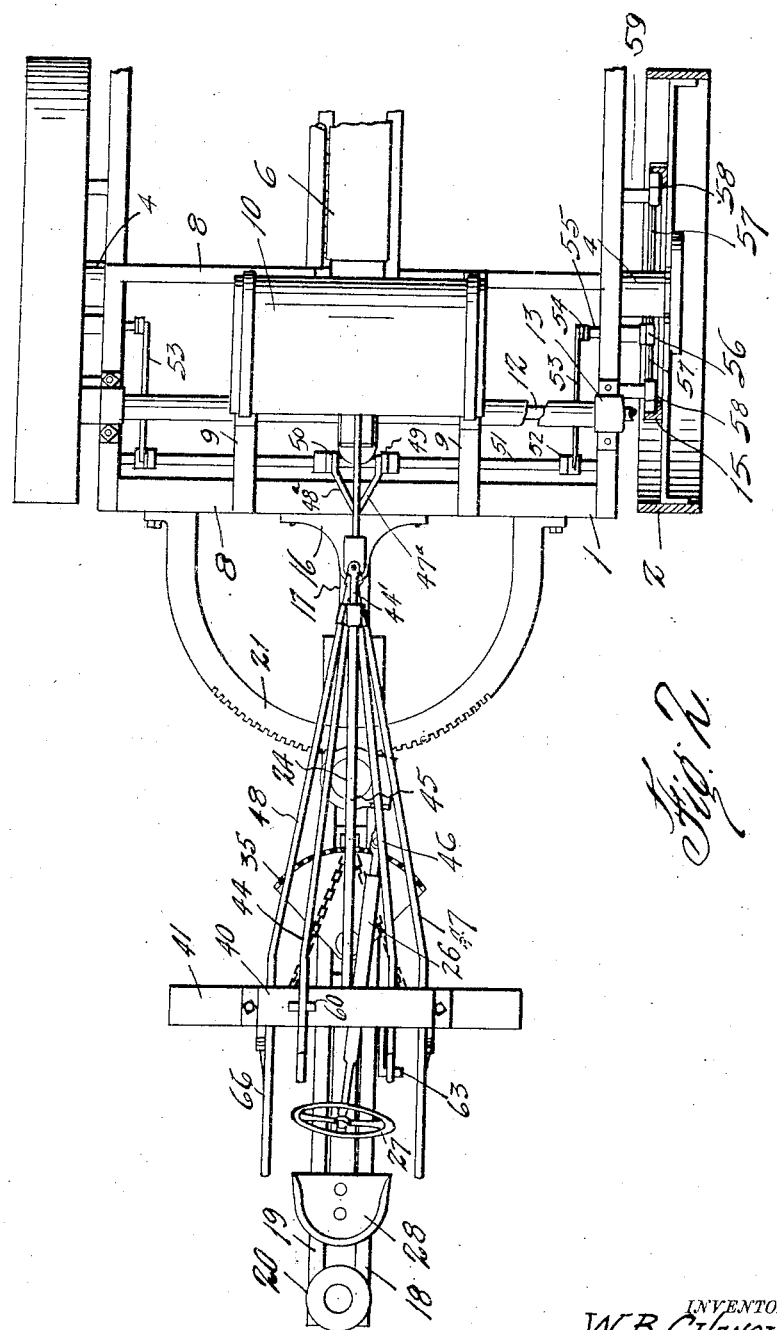
Figure 3:
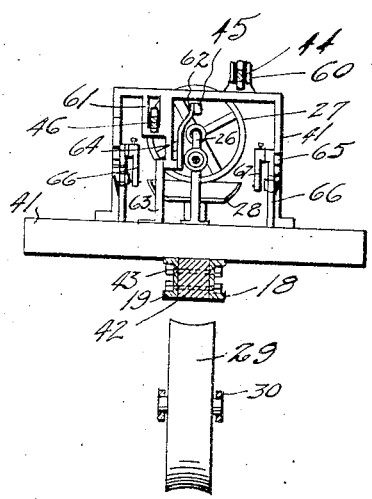
Figure 4:
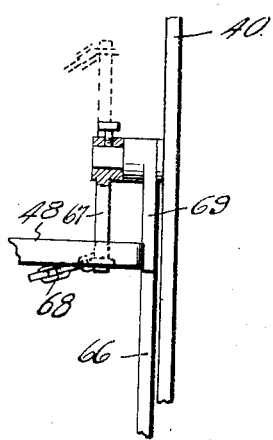
Figure 5:
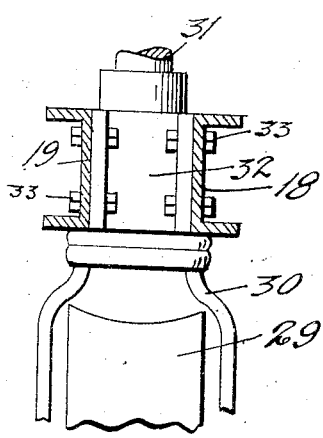
Figure 6:
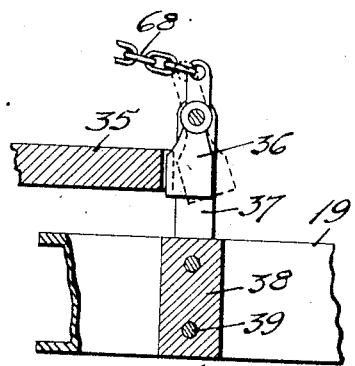

Figure 1 is a side elevation of a tractor constructed in accordance with this invention, Fig. 2 is a partial plan view of the same, Fig. 3 is a transverse sectional view on the line 3—3 of Fig. 1, Fig. 4 is a detail of one of the adjusting lever mechanisms, Fig. 5 is a detail of the trailer wheel mounting, Fig. 6 is a sectional detail of the trailer wheel lock, Fig. 7 is a view showing a modified form of jointed connection between the units, portions being illustrated in elevation and also portions in section, Fig. 8 is a plan view of the same, and Fig. 9 is a detail of the jointed connection.

In the drawings the numeral 1 designates the main horizontal frame of a driving unit which is supported on ground wheels 2. Subbeams 3 are suspended under the side beams of the main frame and axle boxes 4 for the wheels 2 are supported between the beams 3 and the frame 1 and connected to these parts. The rear ends of the beams 3 terminate flush with the rear end of the frame 1 and these parts are connected and spaced apart by a plate 5. On the forward portion of the frame 1 a suitable motor 6 together with its usual accessories is mounted. This motor is connected with a clutch and transmission structure 7 which is supported on cross beams 8 and short longitudinal bars 9 which latter are carried by the beams 8. A fuel oil tank 10 is supported on the bars 9. A differential mechanism 11 is connected with the transmission and imparts motion to a transverse drive shaft 12 which is housed and supported in blocks 13 at each side of the frame 1. The shaft 12 carries at each end a pinion 14 which meshes with a large gear 15 secured to the adjacent ground wheel 2. This describes in a general way the driving mechanism of the driving unit and no claim is made to the particular structure of the motor, transmission and driving elements as they may be selected from a wide range of manufacture.

At the center of the driving or motor unit is mounted a trunnion block 16 having its trunnion or pivot members in vertical alinement. This block is bolted to the plate 5 and has its extremities fitting in a yoke 17 directed rearwardly therefrom and pivoted thereto. The yoke forms the connecting end of a trailing unit which includes a longitudinal rearwardly extending beam 18 preferably formed of spaced channel irons 19 with their straight sides adjacent. The yoke is secured between the forward ends of the channel irons while a turn-table 20 is mounted at the rear ends of the same and provides means for attachment of a trailer, machine or implement.

A large gear segment 21, having its center coincident with the pivot points of the block and yoke, is fastened to the plate 5 and projects over the beam 18. A pinion 22 mounted on a support 23 meshes with the segment 21 and is operated by a worm gearing mechanism 24, which has connection by means of a universal joint 25 with a steering shaft 26 carrying a steering wheel 27 in convenient relation to a driver's seat 28. When the steering wheel is revolved the pinion 22 is rotated and travels on the segment 21 which adjusts the trailing unit laterally whereby the beam 18 extends at an angle to the longitudinal center of the tractor.

The beam 18 is supported by a follower or trailing wheel 29 which is mounted in a yoke 30 which has a pivot stud 31 extending up through a bearing block 32 disposed between the channels 19 and secured thereto by bolts 33, as shown in detail in Fig. 5. In Fig. 1 it will be seen that the channel irons 19 have holes 34 spaced apart in regular order and these receive the bolts 33. By this arrangement the block 32 may be positioned at various points along the beam 18 as is found necessary. The stud 31 projects above the beam 18 and carries a locking sector 35 which projects forward. A latch 36 is pivoted in a bracket 37 which is mounted on a block 38 disposed between the channel irons and fastened by bolts 39 passing through some of the holes 34. The latch 36 normally engages in the teeth of the sector 35 and locks the same against rotation whereby the wheel 29 is locked against lateral adjustment.

It will be seen that when the sector 35 is locked so as to hold the wheel parallel with the beam 18 said beam will trail behind the driving unit and follow the same. Should it be desired to operate the tractor with the beam 18 swung to one side it is merely necessary to adjust the beam by means of the steering gear and release the sector 35 by withdrawing the latch 36, whereby the wheel 29 is permitted to adjust itself to the line of draft after which the segment may be locked and the wheel 29 held in this position. It is obvious that the line of draft of the wheels 2 and 29 will be parallel and the adjustment of the beam will be maintained. Tools or implements attached to the beam may be operated on either side of the center of the tractor or even laterally with relation to the ground wheels 2.

A controlling stand 40 is mounted on a transverse bar 41 which has a lug 42 depending between the channel irons 19 and fastened by bolts 43 also passing through some of the holes 34. The stand 40 supports the controlling elements for the motor and the driving unit. Bars 44, 45 and 46 are disposed in superposed order, as shown in Fig. 1. Below these are similar bars 47 and 48 which are opposite each other. Each of the bars has telescoping thereinto a shank 80 which I have designated by the numerals 44', 45', 46', 47' and 48' respectively. The shank 44' has jointed connection with a rod 44$^a$ which is suitably connected with the throttle of the motor 6. The shank 45' is connected with a rod 45$^a$ which is connected with the clutch mechanism in a suitable manner. The shank 46' is connected with a rod 46$^a$ which is suitably connected with the transmission mechanism 7. The shanks 47' and 48' are connected respectively to laterally bent rods 47$^a$ and 48$^a$.

As the rods 47$^a$ and 48$^a$ control mechanisms which while individual and separate, are duplicates a description of one will suffice for both. The rod 48$^a$ has connection with a lever 50. A horizontal rock shaft 51 is mounted under the frame 1 and has a lever 49 fastened thereon and connected with rod 47$^a$ fixed to its inner end. An upstanding arm 52 is fixed on the shaft 51 and is pivoted to the rear end of a link 53 which is pivoted at its forward end to a lever 54 mounted on the inner end of a shaft 55 which carries a brake expanding member 56 on its outer end. The member 56 is disposed within the gear and has pivoted to diametrically opposite points the inner ends of links 57 which are pivoted at their outer ends to brake shoes 58 suspended from housings 59 mounted on the outside of the frame 1. The shoes when spread apart are forced outward by the expander 56 and engage the inner periphery of the gear 15 and fasten the wheel 2 against revolution, it being understood that the wheel has the usual pawl and ratchet connection with its axle as is common in this art. This mechanism is duplicated on the other side and it is operated by the lever 50. This braking mechanism is used for making short and square turns. It will be seen that if one of the wheels is locked against revolution and the trailing member swung to the limit of its lateral adjustment the locked wheel becomes the pivot point of an arcuate path traveled by the other wheel in making a square turn. This braking and turning mechanism forms the subject matter of a companion application which has been simultaneously executed and filed at the same time as the filing of this application.

As before stated all parts are controlled from the stand 40. The bar 44 is provided with teeth which engage in a keeper 60 on top of the stand 40; while the bar 46 is provided with teeth engaging in a keeper 61 (see Fig. 3) depending within the stand. Either bar may be lifted to disengage the teeth and adjusted longitudinally to operate the parts controlled thereby. The bar 45 is pivoted to the upper end of an arm 62 connected with a clutch lever 63 pivoted in a hanger 64. Each upright of the stand carries a rearwardly projecting locking segment 65 and a lever 66 each of which has a depending arm 67 from which a chain 68 extends to the latch 36. Each lever 66 also has an integral depending arm 69. One of the arms 69 has connection with the rear end of the bar 47, and the other arm 69 has connection with the rear end of the bar 48. By pulling either lever upward the bar connected therewith is pulled rearward and at the same time one of the chains 68 is pulled whereby the latch 36 is swung out of the sector 35 so that in making a short turn the wheel 29 may trail properly. It will be noted as indicated in Fig. 4 that the lever 67 is adjustable and could be pointed either up or down. The stand 40 and its base 41 are adjustable longitudinally of the beam 18, and for this reason fastenings 80' and telescoping shanks are provided in order that the connections may be lengthened or shortened. A supporting standard 70 is mounted on the yoke 17 and supports the rods which are jointed to the shanks.

In Figs. 7, 8 and 9 I have illustrated a modified form of joint between the driving and trailing units which not only provides for a lateral adjustment like that shown in the other figures but also provides for an axial adjustment. The same reference numerals will be used in describing parts except where additional parts are added. The sector 35 is shown reversed and the arms 67 are pointed upward so as to release the latch 36. The standard 70 is omitted and another standard 71 is mounted on the shank of the yoke which is secured between the channel irons 19. The yoke 17 receives and is pivoted to trunnions 72 projecting rearwardly from a swivel plate 73 which is centrally pivoted on a stud 74 mounted in a support 75 under the frame 1, and in longitudinal alinement with the center of the axles of the wheels 2 whereby the longitudinal axis of the swivel plate intersects the longitudinal axis of the axles of the ground wheels. The plate 73 is disposed against the plate 5 and is provided with arcuate shoes 76 engaging in keepers 77 mounted on the parts 1 and 3 as shown in detail in Fig. 9. It will be seen that the plate 73 becomes a part of the trailer unit and rotates therewith. The plate 73 also carries a rearwardly extending gear segment 78 which meshes with the pinion 22. This segment has a skeleton frame through which the standard 71 and the yoke 17 project upward.

The beam 18 is supported by a bolster 79 suitably fastened to the beam transversely thereof and having yokes 80 mounted at its outer ends and carrying ground wheels 81. The yokes are positioned so that the wheels 81 will track the wheels 2. Each yoke has an upstanding stud 82 to which a forwardly projecting arm 83 is secured. A forwardly projecting arm 84 is attached to the sector 35 and is suitably pivoted to a transverse link 85, pivoted at its ends to the levers 83, whereby the sector and the wheels 81 are swung in unison. When the latch 36 is withdrawn the sector and the wheels are free to swing, and said wheels being connected will maintain their relative alinement when swung at various angles. The same block 32 may be used for the sector 35 which may be suitable mounted thereon and the yoke 30 omitted.

It is evident that by provision of the swivel joint between the units an axial displacement of one will have no effect on the other, and owing to the length of the tractor this is of great advantage as where one of the ground wheels 2 is displaced upward or downward the trailer unit will assume and maintain the axial adjustment imparted to it by its supporting wheels 81 and any implements, vehicles or parts attached to the trailer unit will not be disturbed or displaced by axial displacement of the driving unit.

What I claim, is,

1. In a tractor, driving and trailer units hingedly connected together, a swivelly-journaled caster wheel on said trailer unit, fastening means for securing said caster wheel to said trailer unit, said trailer unit having means at different points thereon for receiving said fastening means whereby the caster wheel may be adjusted at different positions, and a locking means for the caster wheel also adjustably mounted on said trailer unit.

2. In a tractor, a wheeled driving unit, a trailer unit connected to the driving unit, a caster wheel adjustably connected to said trailer unit, and a locking means for the caster wheel also adjustably mounted on said trailer unit.

3. In a tractor, the combination with a driving unit mounted on ground wheels and having means for transmitting motion to the ground wheels, of a trailer unit hinged to the driving unit and arranged to swing laterally with relation thereto, said trailer unit including a longitudinal beam, a trailer wheel supporting the beam and adjustable longitudinally thereof, and a locking device for the trailer wheel also adjustable longitudinally of the beam.

4. In a tractor, the combination with a driving unit mounted on ground wheels and having means for transmitting motion to the ground wheels, of a trailer unit hinged to the driving unit and arranged to swing laterally with relation thereto, said trailer unit including a longitudinal beam, a trailer wheel supporting the beam and adjustable longitudinally thereof, a locking device for the trailer wheel also adjustable longitudinally of the beam, and a controlling mechanism mounted on the trailer unit and having connection with the motive and transmission mechanism of the driving unit.

5. In a tractor, a driving unit supported on ground wheels and a trailer unit, in combination with a trunnion member mounted on the driving unit, a yoke secured to the trailer unit and pivoted on the trunnion member, a gear segment connected with the driving unit and overhanging the trailer unit, a steering gear device mounted on the trailer unit and engaging with the gear segment, a trailer wheel, a yoke in which the wheel is mounted, said yoke being pivoted in the trailer member, a locking sector carried by the yoke, and a latch mounted on the trailer unit and engaging the sector.

6. In a tractor, the combination with a driving unit mounted on ground wheels and having means for transmitting motion to the ground wheels, of a trailer unit hinged to the driving unit and arranged to swing laterally, said trailer unit including a longitudinal slotted beam, a trailer yoke adjustable longitudinally in the slot of the beam, a trailer wheel mounted in the yoke, a locking device for the trailer yoke adjustable longitudinally in the slot of the beam, a controlling stand mounted on the beam and adjustable longitudinally thereof, a steering device supported in the stand and having connection with the driving unit, controlling devices also mounted on the stand, the steering and controlling devices being longitudinally adjustable, and connections extending from the controlling devices to the driving and transmission parts of the driving unit.

7. In a tractor, driving and trailer units pivoted together, controlling devices extending between said units adjustable as to length and longitudinally movable, a longitudinally-movable controlling stand on said trailer unit for supporting the controlling devices, and fastenings for holding the controlling stand on said trailer unit, said trailer unit having means at different points to receive said fastenings whereby the stand may be moved to different positions, a swivelly-journaled caster wheel on said trailer unit, and a locking means for the caster wheel also adjustably mounted on said trailer unit.

In testimony whereof I affix my signature.

WILLIAM B. CHENOWETH.